(12) United States Patent
Xu et al.

(10) Patent No.: US 11,012,002 B1
(45) Date of Patent: May 18, 2021

(54) SINGLE-PHASE VOLTAGE SOURCE INVERTER CIRCUIT WITH POWER DECOUPLING, AND CONTROL METHODS

(71) Applicant: University of New Brunswick, Fredericton (CA)

(72) Inventors: Shuang Xu, Fredericton (CA); Liuchen Chang, Fredericton (CA); Riming Shao, Fredericton (CA)

(73) Assignee: University of New Brunswick, Frederiction (CA)

( * ) Notice: Subject to any disclaimer, the term of this patent is extended or adjusted under 35 U.S.C. 154(b) by 0 days.

(21) Appl. No.: 15/840,529

(22) Filed: Dec. 13, 2017

Related U.S. Application Data

(60) Provisional application No. 62/485,208, filed on Apr. 13, 2017.

(51) Int. Cl.
*H02M 7/79* (2006.01)
*H02M 7/797* (2006.01)
*H02J 3/38* (2006.01)

(52) U.S. Cl.
CPC ............. *H02M 7/797* (2013.01); *H02J 3/383* (2013.01)

(58) Field of Classification Search
None
See application file for complete search history.

(56) References Cited

U.S. PATENT DOCUMENTS

| | | | |
|---|---|---|---|
| 5,734,565 A | 3/1998 | Mueller et al. | |
| 6,483,730 B2 | 11/2002 | Johnson, Jr. | |
| 8,711,585 B2 | 4/2014 | Liu et al. | |
| 9,167,340 B2 | 10/2015 | Rois et al. | |
| 9,621,041 B2 | 4/2017 | Sun et al. | |
| 2011/0181231 A1* | 7/2011 | Ito | B60L 11/14 318/801 |

(Continued)

FOREIGN PATENT DOCUMENTS

CN 103401267 A 11/2013

OTHER PUBLICATIONS

Zhang et al., "Pulse Energy Modulation of a Buck-Boost Inverter", Nov. 2011, pp. 2001-2006.*

(Continued)

*Primary Examiner* — Jeffrey A Gblende
(74) *Attorney, Agent, or Firm* — Eugene F. Derényi; Fogler, Rubinoff LLP (57) ABSTRACT

A single-phase voltage source inverter including a first stage configured to be connectable to a DC source, and a second stage configured to be connectable to an AC load, the first stage including a bridge leg including first and second decoupling switches, the bridge leg connected through an inductor to a decoupling capacitor, where the decoupling capacitor is in series with the DC source when the inverter is connected to the DC source, and the second stage including a bi-directional H-bridge inverter including first, second, third and fourth switches. The decoupling capacitor can be a small film capacitor. The first and second decoupling switches are the only decoupling switches in the bridge leg. The first controller can use pulse width modulation and the second controller uses sinusoidal pulse width modulation. The first controller can use pulse width modulation and the second controller uses pulse energy modulation.

9 Claims, 12 Drawing Sheets

(56) References Cited

U.S. PATENT DOCUMENTS

| | | | | |
|---|---|---|---|---|
| 2012/0155139 A1* | 6/2012 | Boeke | ............... | H02M 3/1584 |
| | | | | 363/131 |
| 2014/0001856 A1* | 1/2014 | Agamy | ............... | H02M 3/155 |
| | | | | 307/43 |
| 2014/0056044 A1* | 2/2014 | Yang | ............... | H02M 7/537 |
| | | | | 363/97 |
| 2014/0217827 A1* | 8/2014 | Cheek | ............... | H02M 7/5387 |
| | | | | 307/66 |
| 2015/0311851 A1* | 10/2015 | Kondo | ............... | H02P 27/085 |
| | | | | 318/400.27 |
| 2016/0065049 A1* | 3/2016 | Wu | ............... | H02M 1/12 |
| | | | | 363/40 |

OTHER PUBLICATIONS

Charles R. Sullivan, Jonathan J. Awerbuch, and Alexander M. Latham; Decrease in Photovoltaic Power Output from Ripple: Simple General Calculation and the Effect of Partial Shading;IEEE Transactions on Power Electronics, vol. 28, No. 2, Feb. 2013, pp. 740-747.

Souhib Harb Haibing Hu, Nasser Kutkut, Issa Batarseh, and Ahmad Harb;Three-Port Micro-Inverter with Power Decoupling Capability for Photovoltaic (PV) System Applications;Department of Electrical Engineering and Computer Science University of Central Florida Orlando, FL 32826 German Jordanian University, Amman—Jordan, pp. 2065-2070.

Xin Cao, Qing-Chang Zhong, Wen-Long Ming; Ripple Eliminator to Smooth DC-Bus Voltageand Reduce the Total Capacitance Required;IEEE Transactions on Industrial Electronics, vol. 62, No. 4, Apr. 2015, pp. 2224-2235.

Yoshiya Ohnuma, Koji Orikawa, and Jun-ichi Itoh;A Single-Phase Current-Source PV Inverter With Power Decoupling Capability Using an Active Buffer;IEEE Transactions on Industry Applications, vol. 51, No. 1, Jan./Feb. 2015, pp. 531-538.

Hiroki Watanabe, Keisuke Kusaka, Keita Furukawa, Koji Orikawa, Jun-ichi Itoh;DC to Single-phase AC Voltage Source Inverter with Power Decoupling Circuit based on Flying Capacitor Topology for PV System; 2016 IEEE, pp. 1336-1343.

Guo-Rong Zhu, Siew-Chong Tan, Yu Chen, and Chi K. Tse; Mitigation of Low-Frequency Current Ripple in Fuel-Cell Inverter Systems Through Waveform Control; IEEE Transactions on Power Electronics, vol. 28, No. 2, Feb. 2013, pp. 779-792.

Wenli Yao, Xiongfei Wang, Poh Chiang Loh, Xiaobin Zhang, and Frede Blaabjerg; Improved Power Decoupling Scheme for a Single-Phase Grid-Connected Differential Inverter With Realistic Mismatch in Storage Capacitances; IEEE Transactions on Power Electronics, vol. 32, No. 1, Jan. 2017, pp. 186-199.

Haiyu Zhang, Xiao LI, Baoming GE, and Robert S. Balog;Comparison of Double-Line Frequency Ripple Power Decoupling for Single-Phase Systems; IEEE Industrial Electronics Magazine Sep. 2017; pp. 37-49.

G.Sukant and N.Jayalakshmi; Power Factor Improvement with Single Phase Diode Rectifier in Interior Permanent Magnet Motor; International Journal of Advanced Research in Electrical, Electronics and Instrumentation Engineering, vol. 3, Special Issue 2, Apr. 2014, pp. 527-532.

Keisuke Toyama and Toshihisa Shimizu; A High-Efficiency Single-Phase Utility Interactive Inverter with an Active Power Decoupling Function and its Control Method;Electrical Engineering in Japan, vol. 198, No. 4, 2017, pp. 63-72.

Wen Cai, Ling Jiang, Bangyin Liu, Shanxu Duan and Changyue Zou; A Power Decoupling Method Based on Four-Switch Three-Port DC/DC/AC Converter in DC Microgrid; IEEE Transactions on Industry Applications, vol. 51, No. 1, Jan./Feb. 2015, pp. 336-343.

\* cited by examiner

SINGLE-PHASE VOLTAGE SOURCE INVERTER CIRCUIT WITH POWER DECOUPLING, AND CONTROL METHODS

BACKGROUND

In single-phase inverter systems, particularly photovoltaic (PV) single-phase inverters, constant input power to the inverter is desired, whereas pulsating instantaneous power is required by a single-phase AC load as produced by the sinusoidal voltage and current. In this case, the pulsating power creates a second-order ripple on the DC voltage or current, which reduces the PV conversion efficiency if not decoupled from the PV panels [1].

Figure 1:
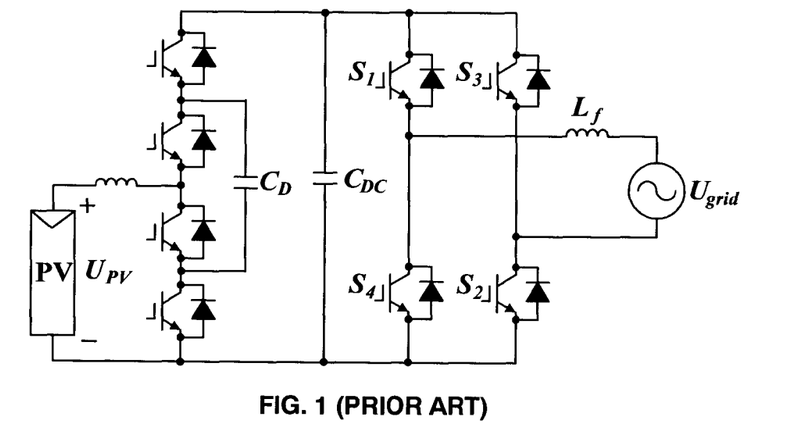
FIG. 1 illustrates a schematic of a prior art H-bridge inverter with a flying capacitor DC-DC converter.

In a passive power decoupling method, an electrolytic capacitor which has a large size and short lifespan compared with PV panels is used at the DC side of the inverter, and is the limiting factor for the lifetime of PV systems. To replace the bulky electrolytic capacitor with a small film capacitor, a few current-reference active power decoupling methods have recently been proposed in the literature [2]-[4], which are commonly applied in flyback inverters. Since flyback inverters are not suitable for power higher than several hundred watts due to the difficulty of designing the flyback transformers, bridge inverters have been widely used in the distribution systems such as PV systems. However, the DC voltage must be constantly high to guarantee the operation of bridge inverters, which is difficult to achieve by unpredictable renewable energy and thus necessitates a voltage-boosting mechanism. In an attempt to integrate voltage-boosting capability and power decoupling capability, the prior art bridge inverter illustrated in FIG. 1 was proposed with a flying capacitor DC converter as the first stage to boost the voltage and decouple the pulsating power [5]. The voltage across the decoupling capacitor $C_D$ is controlled as DC-biased sine wave fluctuating at twice grid frequency to cancel out the second-order pulsating power. However, four switches are needed to achieve both voltage-boosting and power decoupling capabilities. In addition, the input inductance is high because the inductor current is a control variable for the inverter.

BRIEF DESCRIPTION OF THE DRAWINGS

To facilitate further description of the embodiments, the following drawings are provided in which.

DETAILED DESCRIPTION OF EXAMPLES OF EMBODIMENTS

According to an embodiment, the present invention relates to an inverter topology with voltage boosting and power decoupling, which has advantages such as adapting to various DC input voltages and eliminating the large electrolytic capacitor. The inverter topology of the present embodiment maintains the advantages of a bridge inverter, while adding the functionalities of active power decoupling and adapting to a wide range of input voltage.

According to another embodiment, the present invention relates to a single-phase voltage source inverter including a first stage configured to be connectable to a DC source, and a second stage configured to be connectable to an AC load which in some embodiments includes an AC grid, the first stage comprising a bridge leg comprising first and second decoupling switches, the bridge leg connected through an inductor to a decoupling capacitor, where the decoupling capacitor is in series with the DC source when the inverter is connected to the DC source, and the second stage comprising a bi-directional inverter, such as an H-bridge inverter including first, second, third and fourth switches. In one embodiment, the decoupling capacitor is a small film capacitor. In another embodiment, the first and second decoupling switches are the only decoupling switches in the bridge leg. In other embodiments, other types of bi-directional inverters can be used. In some embodiments, the inverter further includes a first controller for modulating the first stage and a second controller for modulating the second stage. In some embodiments, the first controller uses pulse width modulation and the second controller uses sinusoidal pulse width modulation. In other embodiments, the first controller uses pulse width modulation and the second controller uses pulse energy modulation.

According to another embodiment, the present invention relates to a method of modulating a bi-directional inverter using pulse energy modulation to provide triggering signals to the switches of the inverter.

Topology Design

Figure 2:
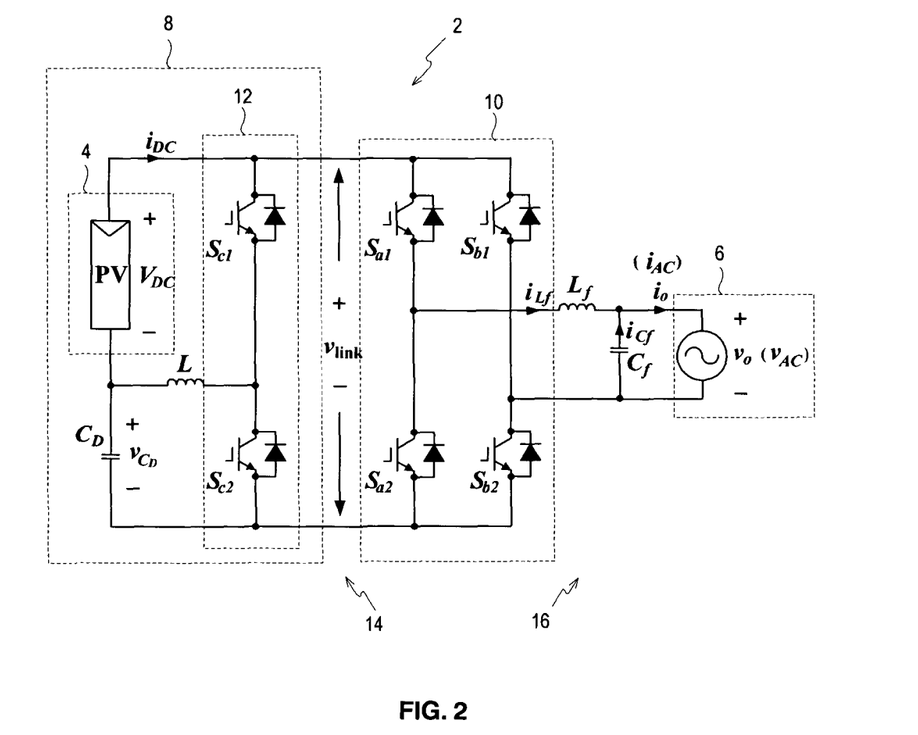
FIG. 2 illustrates a schematic of a power inverter system, according to an embodiment of the present disclosure.

FIG. 2 is a schematic diagram illustrating a single-phase voltage source inverter ("VSI") system indicated generally at 2 according to an embodiment of the present invention. The VSI 2 is configured to provide both voltage-boosting and power decoupling functions. The VSI 2 is further configured to connect to a DC source (such as a photovoltaic DC source 4 illustrated in FIG. 2) and an AC load (such as an AC power grid 6 illustrated in FIG. 2).

The VSI 2 includes a first stage 8 with voltage-boosting and power decoupling functionalities and a second stage 10 with power inversion functionality. In the present embodiment, the first stage 8 is a bi-directional buck-boost converter and includes a bridge leg 12 connected through an inductor L to a decoupling capacitor $C_D$ where the decoupling capacitor $C_D$ is in series with the DC source 4. The bridge leg 12 includes switches $S_{c1}$ and $S_{c2}$. The inductor L has high flexibility because it does not need to withstand DC current from the DC source 4, whereas an inductor in a typical prior art boost inverter does. In other embodiments, the positions of the DC source 4 and the decoupling capacitor $C_D$, as illustrated in FIG. 2, can be interchanged.

The second stage 10 includes a bi-directional inverter which in the present embodiment is an H-bridge which includes switches $S_{a1}$ and $S_{a2}$, and $S_{b1}$ and $S_{b2}$. In other embodiments, other suitable bi-directional inverters can be used. The switches Sai and $S_{a2}$, and $S_{b1}$ and $S_{b2}$ are connect to AC load 6 through inductor $L_f$ and capacitor $C_f$ which function as an AC filter. In other embodiments, an AC filter can be integrated with the bi-directional inverter.

Voltage-Boosting Capability

In the first stage 8, the inductor current is always continuous with complementary triggering signal for the bridge leg 12. The relationship between input DC voltage $V_{DC}$ and the voltage $v_{CD}$ across the decoupling capacitor $C_D$ is:

$$v_{C_D} = \frac{d}{1-d} \cdot V_{DC} \tag{1}$$

where d is the duty cycle of $S_{C_1}$ in the buck-boost converter and the value of d is between 0 and 1.

With the first stage 8, the DC-link voltage $v_{link}$ of the VSI 2 can be calculated as:

$$v_{link} = V_{DC} + v_{C_D} = \frac{1}{1-d} \cdot V_{DC} \tag{2}$$

It can be seen from the relationship between $v_{link}$ and $V_{DC}$ that the buck-boost converter 8 has the voltage-boosting capability, that $V_{link}$ is always greater than $V_{DC}$, and the value of $v_{link}$ can be determined by the duty cycle of $S_{C_1}$.

Power Decoupling Function

To achieve the power decoupling function, the voltage across the power decoupling capacitor $C_D$ is controlled as a DC-biased sine wave. The DC component of the capacitor voltage $v_{C_D}$, is added with input DC voltage, voltage $V_{DC}$, to achieve the voltage-boosting function, and the AC component of the capacitor voltage $v_{C_D}$, is used to cancel out the second-order ripple power. The DC-link voltage $v_{link}$ must always be higher than the peak value of the output AC voltage, to ensure that there is no over-modulation or even malfunction for the bridge inverter of the second stage 10.

The inverter topology in the present embodiment diverts the second-order ripple power into the decoupling capacitor $C_D$ without the need for a bulky/large electrolytic capacitor on the DC side indicated generally at 14 of the VSI 2. In the present embodiment, the decoupling capacitor $C_D$ is a small film capacitor with a capacitance of 160 uF. In other embodiments, other suitable small film capacitors can be used. A bulky/large electrolytic capacitor often has a short lifespan and typically has a capacitance of a few thousand microFarads. The range of the decoupling capacitor voltage $v_{C_D}$ is allowed to be wide so that a small film capacitor is adequate to absorb the second-order ripple power and current. The voltage across the decoupling capacitor is controlled as a DC-biased sine wave, and the DC offset in decoupling capacitor $C_D$ is used to boost the DC-link voltage $v_{link}$, as opposed to being under-utilized as in prior art DC-voltage power decoupling techniques.

To achieve power decoupling, a power flow analysis of the VSI 2 is investigated in the following. Suppose the VSI 2 is operated with unity power factor, then the voltage and current of the AC load 6 are as follows:

$$v_o = V_o \cdot \sin(\omega t) \tag{3}$$

$$i_o = I_o \cdot \sin(\omega t) \tag{4}$$

where $V_o$ and $I_o$ are the peak values of the AC load 6 voltage and current. The current through filtering capacitor $C_f$ can be calculated as:

$$i_{C_f} = C_f \cdot \frac{dv_o}{dt} = I_{C_f} \cdot \cos(\omega t) \tag{5}$$

where $I_{C_f} = \omega C_f V_o$ is the peak current through filtering capacitor $C_f$.

The instantaneous power absorbed by the AC load 6 and by the filtering capacitor $C_f$ are, respectively, $$p_o = v_o i_o = \frac{V_o I_o}{2} - \frac{V_o I_o}{2} \cdot \cos(2\omega t) \tag{6}$$

and $$p_{C_f} = v_o i_{C_f} = \frac{V_o I_{C_f}}{2} \cdot \sin(2\omega t) \tag{7}$$

from which it can be seen that the second-order pulsating power comes from both the AC load 6 and the filtering capacitor $C_f$. To balance the second-order pulsating power on the AC side indicated generally at 16, the VSI 2 is controlled to divert the second-order pulsating power into the decoupling capacitor $C_D$ on the DC side 14, where the decoupling capacitor voltage $v_{C_D}$ is controlled such that the instantaneous power $p_{C_D}$ absorbed by $C_D$ becomes:

$$p_{C_D} = P_o \cdot \cos(2\omega t) - P_{C_f} \cdot \sin(2\omega t) \tag{8}$$

where $$P_o = \frac{V_o I_o}{2}$$

and $$P_{C_f} = \frac{V_o I_{C_f}}{2}.$$

The voltage across the decoupling capacitor $C_D$ is basically a DC-biased sine wave, which contains a DC offset $V_d$ and an additional AC component $v_{add}$. Suppose the voltage across the decoupling capacitor $C_D$ is:

$$v_{C_D} = V_d + v_{add} \tag{9}$$

Then the current flowing through the decoupling capacitor can be calculated as:

$$i_{C_D} = C_D \dot{v}_{C_D} = C_D \dot{v}_{add} \tag{10}$$

where "·" denotes the derivative of the variable.

The instantaneous power $p_{C_D}$ absorbed by $C_D$ is calculated as:

$$p_{C_D} = v_{C_D} i_{C_D} = C_D V_d \dot{v}_{add} + C_D v_{add} \dot{v}_{add} \tag{11}$$

Combining Equation (8) with Equation (11) yields:

$$C_D V_d \dot{v}_{add} + C_D v_{add} \dot{v}_{add} = P_o \cdot \cos(2\omega t) - P_{C_f} \cdot \sin(2\omega t) \tag{12}$$

Taking the integral for both sides, a quadratic equation with respect to $v_{add}$ is obtained:

$$C_D v_{add}^2 + 2C_D V_d v_{add} = \frac{V_o I_o}{2\omega} \cdot \sin(2\omega t) + \frac{V_o^2 C_f}{2} \cdot \cos(2\omega t) \quad (13)$$

From the quadratic function, the additional AC component $v_{add}$ is solved as:

$$v_{add} = -V_d + \sqrt{V_d^2 + \frac{V_o I_o}{2\omega c}\sin(2\omega t) + \frac{c_f}{2C_D}V_o^2\cos(2\omega t)} \quad (14)$$

Thus, the reference decoupling capacitor voltage is calculated as:

$$v_{C_D} = \sqrt{V_d^2 + \frac{V_o I_o}{2\omega C}\sin(2\omega t) + \frac{C_f}{2C_D}V_o^2\cos(2\omega t)} \quad (15)$$

which can be used to control duty cycles of the decoupling switches (i.e. $S_{c1}$ and $S_{c2}$) of the first stage 8 to achieve the power decoupling function.

Since the output voltage of a traditional prior art bridge inverter is always limited by the input DC voltage, voltage-boosting is required if the peak voltage of the AC output is higher than the input DC voltage. The inverter topology according to embodiments of the present invention is able to boost the input DC voltage, ensuring that the DC-link voltage is always higher than the peak output AC voltage. The added inductor L has high flexibility because it does not need to withstand DC current as the inductor in a prior art boost converter does. Moreover, the decoupling switches are easy to modulate by a complementary triggering signal.

As illustrated in FIG. 2, since the first stage 8 buck-boost converter is a bidirectional buck-boost converter, where the inductor current can be controlled as always continuous, the relationship between input DC voltage $V_{DC}$ and the voltage $v_{C_D}$ across the decoupling capacitor $C_D$ is expressed according to Equation (1).

With the connection in FIG. 2, the DC-link voltage $v_{link}$ of the H-bridge of the second stage 10 can be calculated according to Equation (2).

It can be seen from the relationship between $v_{link}$ and $V_{DC}$ that the first stage 8 has the voltage-boosting capability, and the value of $v_{link}$ can be determined by the duty cycle of $S_{C1}$. According to an embodiment, the H-bridge of the second stage 10 can be simply modulated by sinusoidal pulse-width modulation (SPWM).

Active Power Decoupling Method

According to another embodiment, the present disclosure relates to an active power decoupling method. The method can comprise a power decoupling control method based on the power transfer, calculating the duty cycles of the switches according to demanded power, making the modulation technique more direct without adding a low-order ripple component.

The instantaneous power absorbed by the AC load 6 and by filtering capacitor $C_f$ are, respectively, $$p_o = v_o i_o = \frac{V_o I_o}{2} - \frac{V_o I_o}{2} \cdot \cos(2\omega t) \quad (16)$$

and $$P_{C_f} = v_o i_{C_f} = \frac{V_o I_{C_f}}{2} \cdot \sin(2\omega t) \quad (17)$$

The reference decoupling capacitor voltage is calculated as:

$$V_{C_D} = \sqrt{V_d^2 + \frac{V_o I_o}{2\omega C}\sin(2\omega t) + \frac{C_f}{2C_D}V_o^2\cos(2\omega t)} \quad (18)$$

Figure 3:
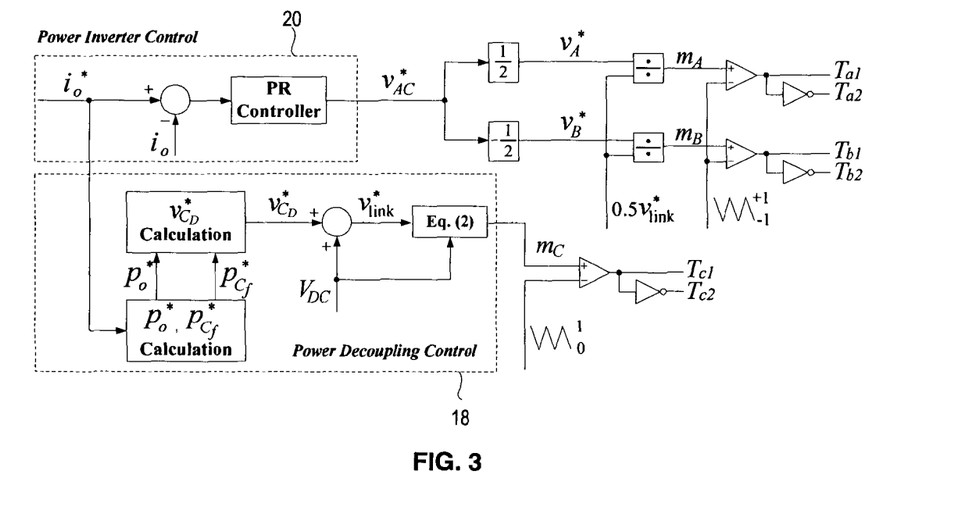
FIG. 3 illustrates a control diagram according to an embodiment of the present disclosure.
Figure 4A:
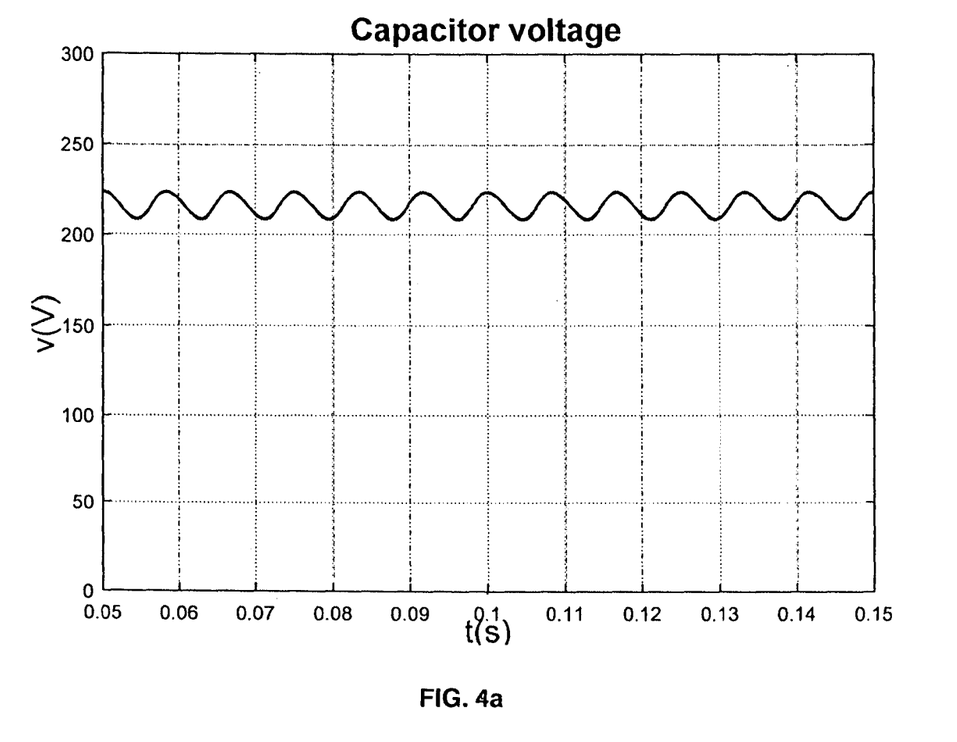
FIGS. 4a-4c illustrate plots of voltage and current waveforms of an inverter with only voltage-boosting capability.
Figure 4B:
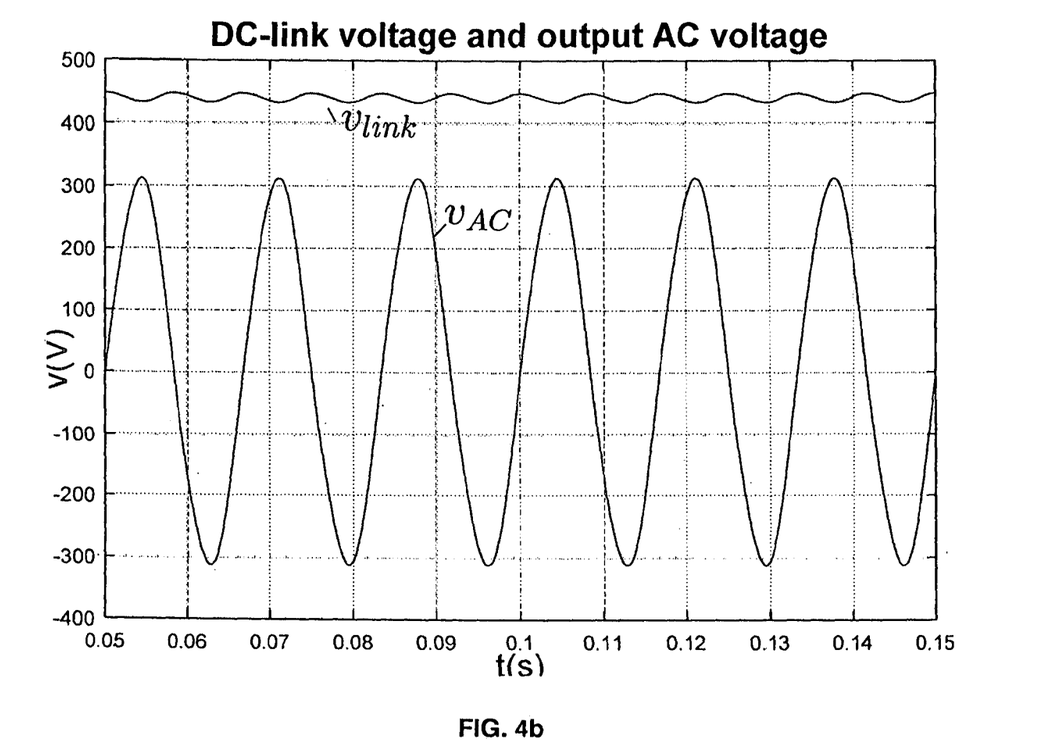
Figure 4C:
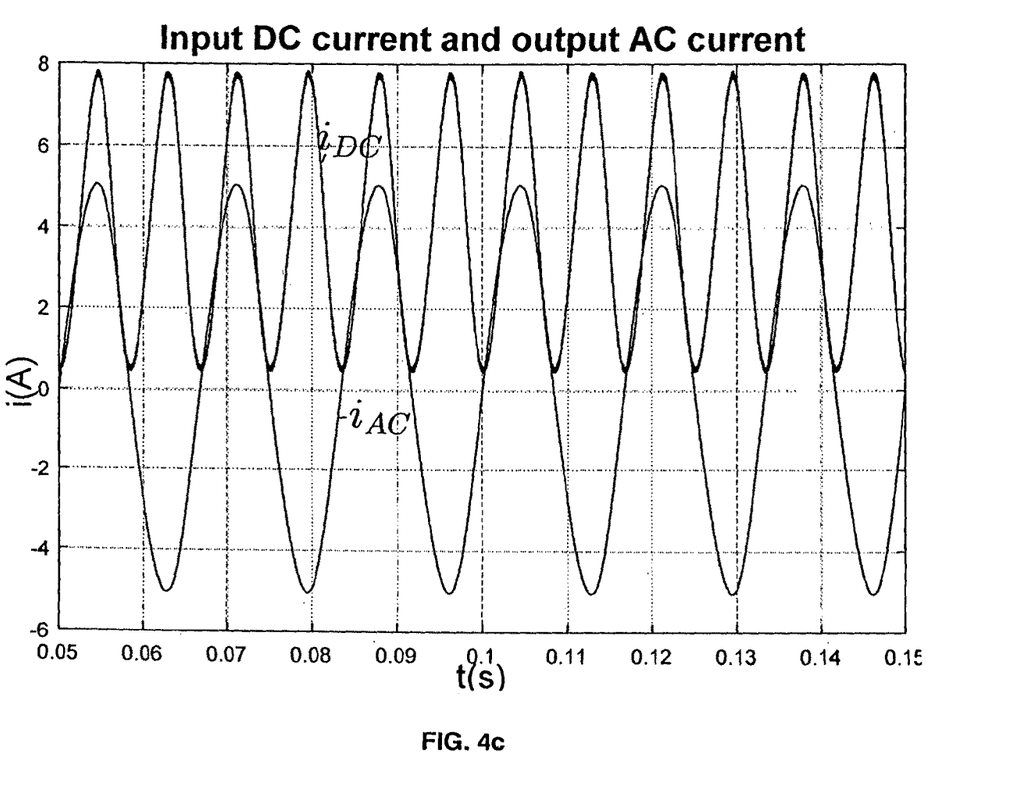
Figure 4D:
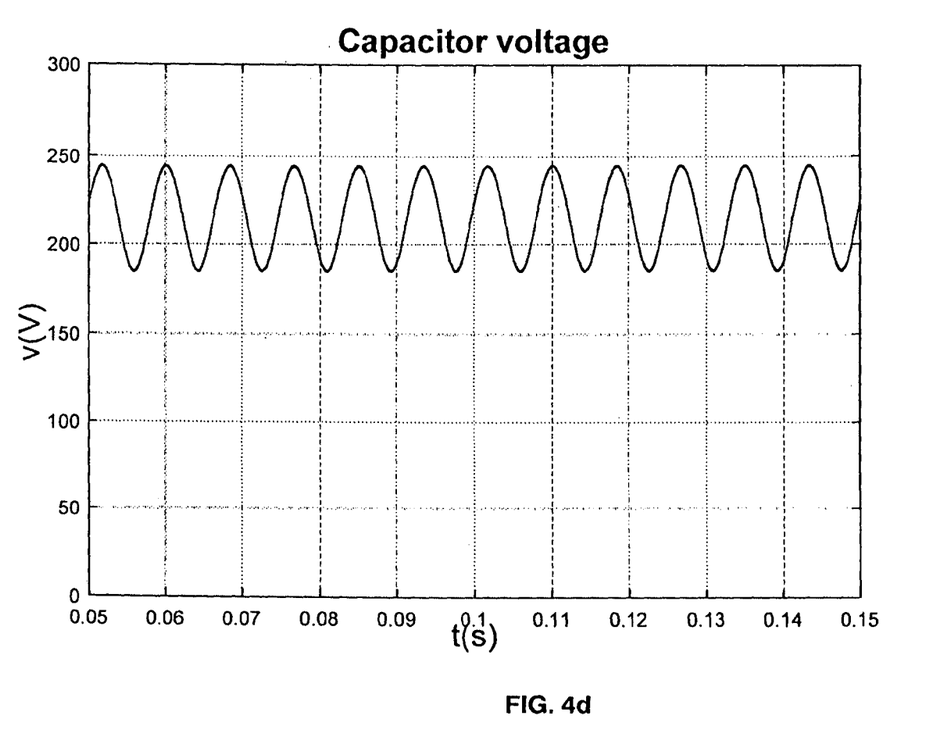
FIGS. 4d-f illustrate plots of voltage and current waveforms of an inverter with both voltage-boosting and power decoupling capabilities according to embodiments of the present disclosure.
Figure 4E:
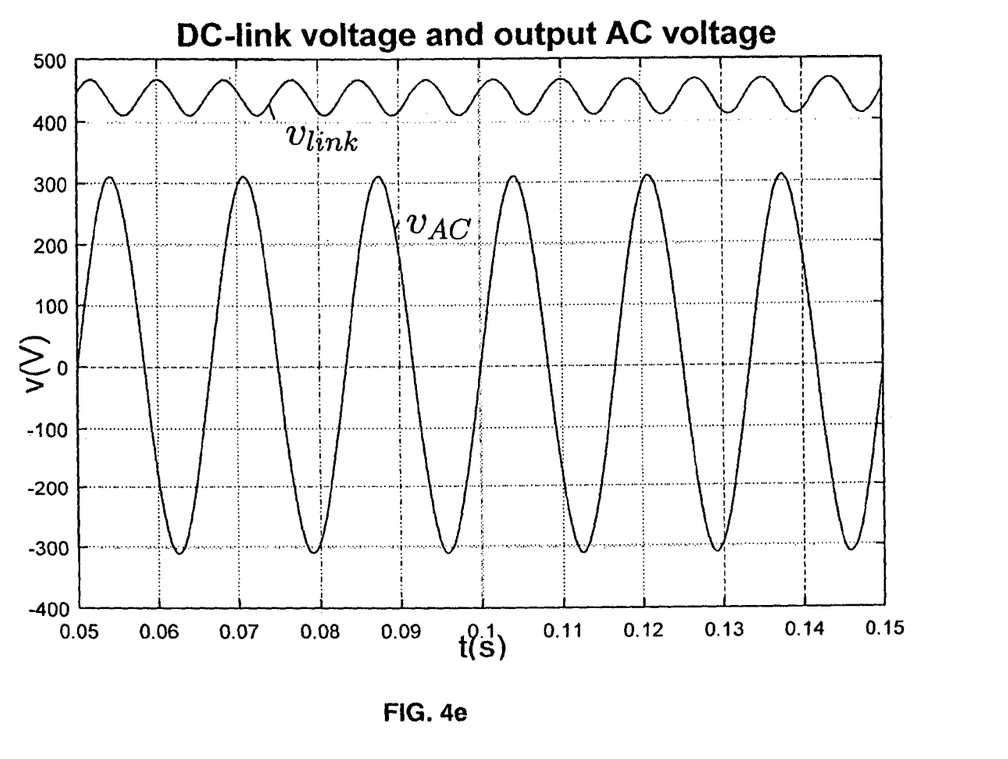
Figure 4F:
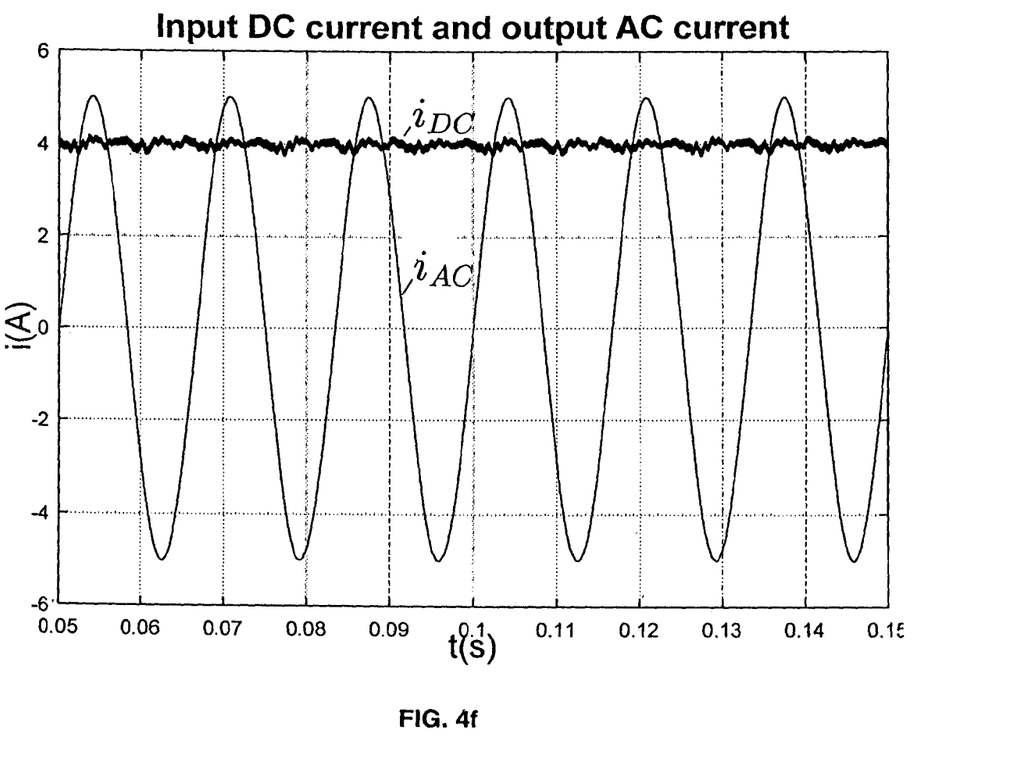

A control block diagram for modulating the VSI 2 is shown in FIG. 3, including the inverter stage control and the power decoupling control. Different from waveform control in some literature [6]-[8], the control method of the present embodiment achieves successful power decoupling without adding any low-order harmonics. The control block diagram for the topology with SPWM is shown in FIG. 3, including the inverter stage control and the power decoupling control. In the inverter stage control, a proportional-resonant controller (PR Controller) is employed instead of a traditional proportional-integral (PI) controller to track the reference AC current, for the PR controller has better sinusoidal signal response. The power decoupling control achieves the desired capacitor voltage based on above equations, which is also added to the DC input voltage to reach higher DC-link voltage to ensure proper operation in the inverter stage control.

Referring to FIG. 3, Power Decoupling Control 18 controls the first stage 8 and in particular, switches $S_{c1}$ and $S_{c2}$, while Power Inverter Control 20 controls the second stage 10 and in particular, the switches $S_{a1}$, $S_{a2}$, $S_{b1}$ and $S_{b2}$. $T_{c1}$ and $T_{C2}$ are the triggering signals for the switches $S_{c1}$ and $S_{c2}$, respectively, while $T_{a1}$, $T_{a2}$, $T_{b1}$ and $T_{b2}$ are the triggering signals for switches $S_{a1}$, $S_{a2}$, $S_{b1}$ and $S_{b2}$, respectively.

Figure 6:
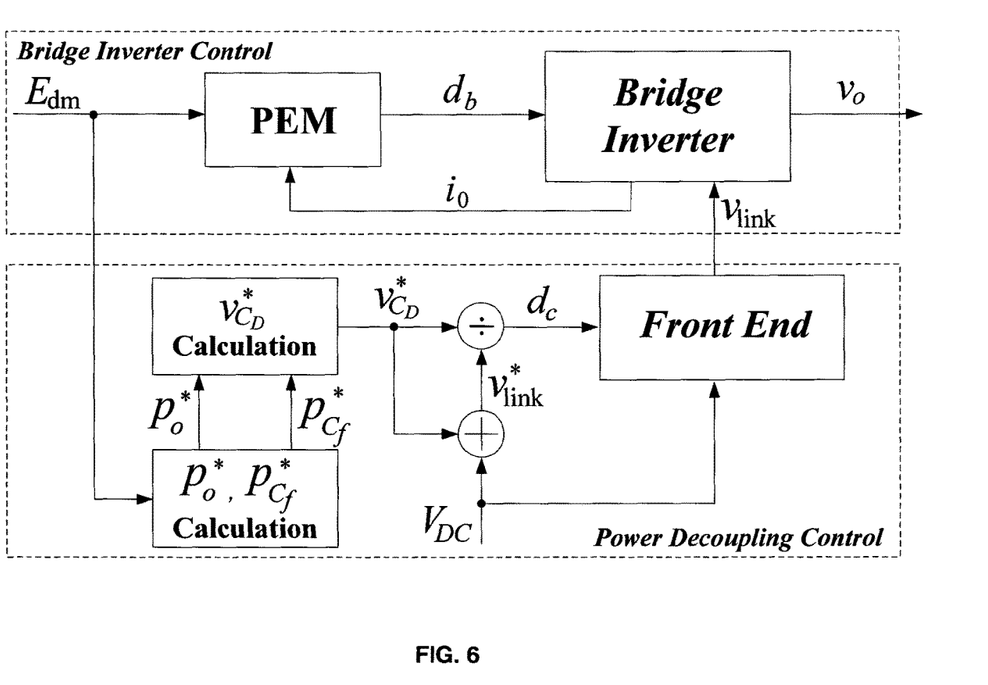
FIG. 6 illustrates a control diagram according to another embodiment of the present disclosure.

According to another embodiment, to increase the flexibility for component design and inverter control, a pulse energy modulation (PEM) method is proposed as an alternative modulation method to sinusoidal pulse width modulation (SPWM) for the bridge inverter of the second stage 10. A control block for modulating the bridge inverter using PEM is illustrated in FIG. 6. The bridge inverter can then be operated under the discontinuous conduction mode (DCM) when the instantaneous output power is low, and under the continuous conduction mode (CCM) when the instantaneous output power is high. The switching losses of the bridge inverter are reduced due to the zero-current switching under DCM. In addition, PEM modulates the bridge inverter based on the energy transfer, making the inverter operation less sensitive to the input voltage fluctuation and AC grid harmonics than SPWM does. In other embodiments, a modulation method using PEM can be used to modulate bridge inverters with other converters as the first stage.

In PEM, the operation principles of the bridge inverter can be described by the following two operating half cycles:

Positive half cycle (PHC): $S_{a1}$ remains on, $S_{a2}$ and $S_{b1}$ remain off; $S_{b2}$ is controlled on and off, acting like a buck chopper, to produce a half sine wave at the output.

Negative half cycle (NHC): $S_{a2}$ remains on, $s_{a1}$ and $S_{b2}$ remain off; $S_{b1}$ is controlled on and off to produce a half sine wave at the output, which is 180° out of phase with PHC and has the opposite polarity of PHC.

During each half cycle, PHC for example, the H-bridge of the second stage 10 operates in two modes:

Mode 1: $S_{a1}$ and $S_{b2}$ are on. The DC source delivers the energy into output inductor $L_f$ and the AC load 6.

Mode 2: Only $S_{a1}$ is on. The output inductor $L_f$ discharges energy into the AC load 6 through $S_{a1}$ and the paralleling diode of $S_{b1}$.

In case of a grid-connected inverter, the AC load 6 becomes an AC grid, and $v_o = V_{grid}$ and $i_o = I_{grid}$, the demanded energy during the $n^{th}$ switching period is calculated approximately from:

$$E_{dm}(n) = V_{grid}(n) \cdot I_{ref}(n) \cdot T_s \qquad (19)$$

in which $V_{grid}(n)$ and $I_{ref}(n)$ are grid voltage and reference grid current, respectively, in the $n^{th}$ switching period, during which $V_{grid}(n)$ and $I_{ref}(n)$ are approximately constant for the fact that the switching frequency is much higher than the line frequency. $T_s$ is the switching period.

If the initial current of the inductor is $I_n(t_0)$ and the inductor current after charging is $I_n(t_1)$ for the $n^{th}$ switching period, the average current flowing to the grid is $$\frac{1}{2}(I_n(t_0) + I_n(t_1)).$$

The energy charged during the $n^{th}$ switching period is calculated from:

$$E_{in}(n) = \frac{1}{2}L_f \cdot (I_n^2(t_1) - I_n^2(t_0)) + \frac{1}{2}V_{grid}(n)(I_n(t_0) + I_n(t_1))DT_s \qquad (20)$$

where D is the duty cycle. According to the energy balance, in each switching period the following equation must be satisfied:

$$E_{in}(n) = E_{dm}(n) \qquad (21)$$

During PHC, $S_{a1}$ remains on, $S_{a2}$ and $S_{b1}$ remain off; the only switch controlled according to PEM is $S_{b2}$. $I_n(t_1)$ can be calculated by:

$$I_n(t_1) = I_n(t_0) + \frac{(v_{link} - V_{grid}(n)) \cdot D_p(n)}{L_f} \qquad (22)$$

The duty cycle for $S_{b2}$ during PHC can be stated as:

$$D_p(n) = \qquad (23)$$

$$\frac{L_f}{T_s \cdot (v_{link} - V_{grid}(n))} \left( \sqrt{I_n^2(t_0) + \frac{2E_{dm}(n) \cdot (v_{link} - V_{grid}(n))}{v_{link} \cdot L_f}} - I_n(t_0) \right)$$

During NHC, $S_{a2}$ remains on, $S_{a1}$ and $S_{b2}$ remain off; the only switch controlled according to PEM is $S_{b1}$. $I_n(t_1)$ can be calculated by:

$$I_n(t_1) = I_n(t_0) + \frac{(-v_{link} - V_{grid}) \cdot D_p(n)}{L_f} \qquad (24)$$

The duty cycle for $S_{b1}$ during NHC can be stated as:

$$D_n(n) = \qquad (25)$$

$$\frac{L_f}{T_s \cdot (v_{link} + V_{grid}(n))} \left( \sqrt{I_n^2(t_0) + \frac{2E_{dm}(n) \cdot (v_{link} + V_{grid}(n))}{v_{link} \cdot L_f}} + I_n(t_0) \right)$$

Figure 7A:
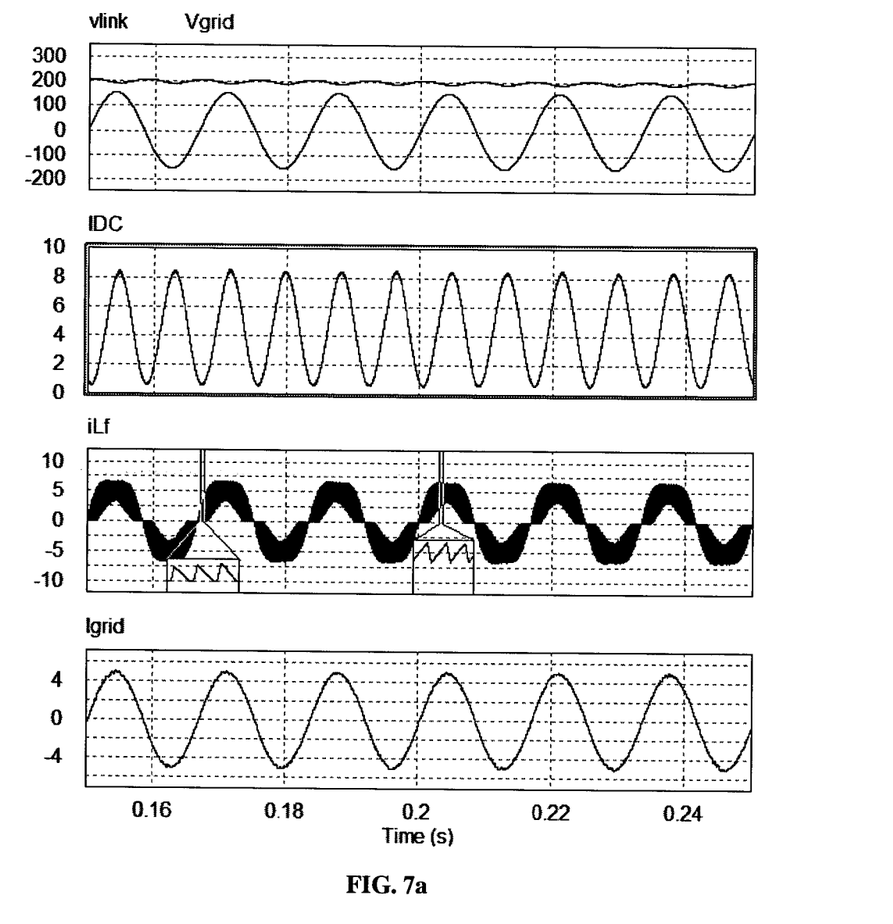
FIG. 7a illustrates a simulation result of a pulse energy modulation (PEM) method according to an embodiment of the present disclosure for controlling an inverter without power decoupling.
Figure 7B:
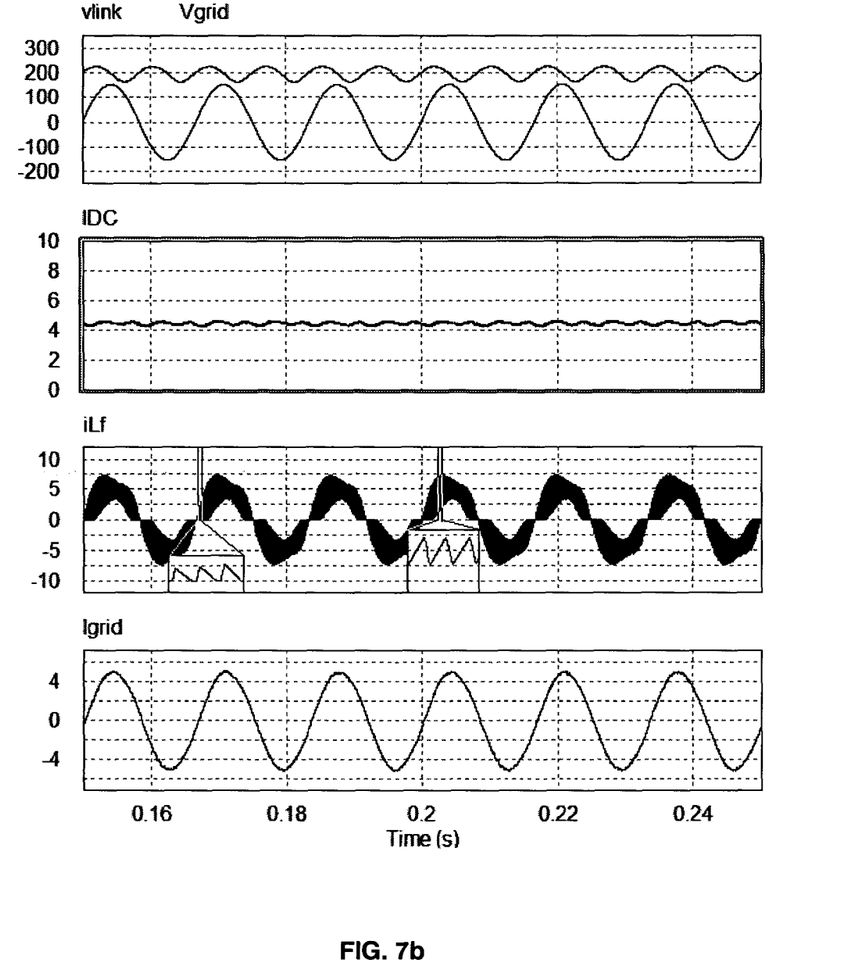
FIG. 7b illustrates a simulation result of a PEM method according to an embodiment of the present disclosure for controlling an inverter with power decoupling.

The simulation result of PEM on the bridge inverter is shown in FIGS. 7a and 7b, where the AC load is composed of a grid in series with an inductor. The output current of the bridge inverter $i_{Lf}$ is discontinuous around zero-crossing of output voltage $V_{grid}$ (same as $v_o$), and is continuous around the crest and trough of $V_{grid}$. PEM achieves zero-current switching when $i_{Lf}$ is discontinuous.

The parameters of the new single-phase inverter according to one embodiment have been designed in MATLAB/SIMULINK and PSIM.

Simulation and Experimental Results

To verify single-phase inverter topology and modulation methods according to some embodiments, a 750 W single-phase VSI with a buck-boost stage was designed in the MATLAB/SIMULINK environment. The key parameters are listed in Table 1. With input DC voltage as 225V, the simulation results, using the parameters in Table 1 are shown in FIGS. 4a-c and FIGS. 4d-f, where $v_o = V_{AC}$ and $i_o = i_{AC}$.

TABLE 1

| PARAMETERS OF A SINGLE-PHASE VSI | |
|---|---|
| Input DC voltage $V_{DC}$ | 225 V |
| Output peak AC voltage $V_O$ | 311 V |
| Output peak AC current $I_O$ | 5 A |
| Output load rated power $P_O$ | 750 W |
| Filtering Inductance $L_f$ | 1 mH |
| Flyback Inductance L | 300 µH |
| Filtering Capacitance $C_f$ | 10 µF |
| Power decoupling capacitance $C_D$ | 160 µF |
| AC frequency $f_{AC}$ | 60 Hz |
| Switching frequency $f_s$ | 10 kHz |

Figure 5A:
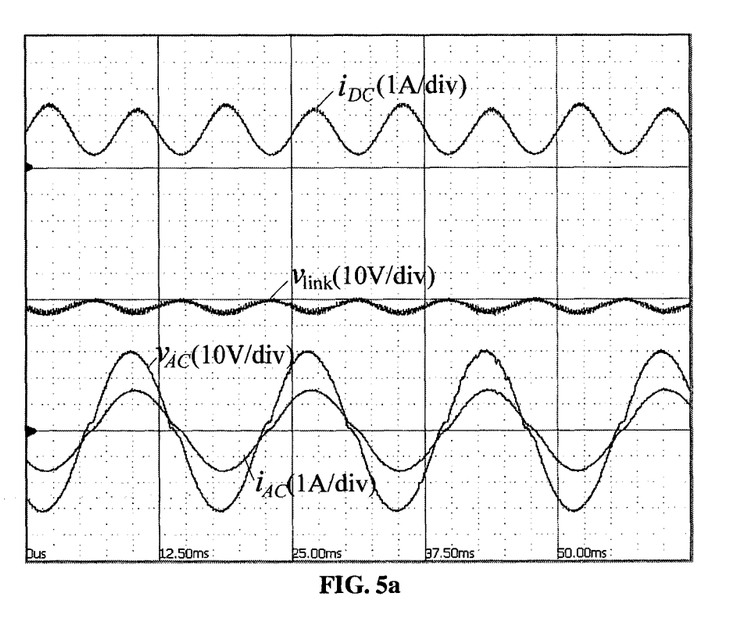
FIG. 5a illustrates a plot of experimental results for the proposed inverter without power decoupling control.
Figure 5B:
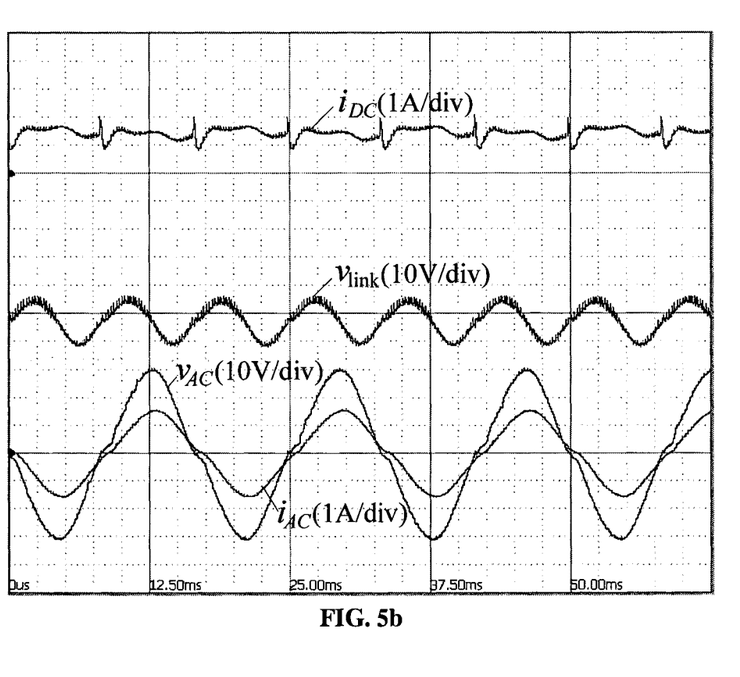
FIG. 5b illustrates a plot of experimental results for an inverter with power decoupling control according to an embodiment of the present disclosure.

In laboratory tests, a DSP TMS320F28335 microprocessor was programmed to provide control and protection functions for the inverter. The preliminary results are shown in FIG. 5a and FIG. 5b, containing waveforms of input DC current, DC-link voltage, output AC voltage and output AC current, and being preliminary results, the voltage and current values are lower than the parameters in Table 1. The DC-link voltage is always higher than the peak output AC voltage, ensuring the bridge inverter never reach the overmodulation region. The second-order ripple component has been mitigated in the input DC current in FIG. 5b, indicating the successful power decoupling.

REFERENCES

[1] C. R. Sullivan, J. J. Awerbuch and A. M. Latham, "Decrease in photovoltaic power output from ripple: Simple general calculation and the effect of partial shading," *IEEE Trans. Power Electron.*, vol. 28, no. 2, pp. 740-747, February 2013.

[2] S. Harb, H. Hu, N. Kutkut, I. Batarseh and A. Harb, "Three-port micro-inverter with power decoupling capability for photovoltaic (PV) system applications," in *Proc. 23rd Annu. IEEE Int. Symposium Ind. Electron. (ISIE)*, June 2014, pp. 2065-2070.

[3] X. Cao, Q. Zhong and W. Ming, "Ripple eliminator to smooth DC-bus voltage and reduce the total capacitance required," *IEEE Trans. Ind. Electron.*, vol. 62, no. 4, pp. 2224-2235, April 2015.

[4] Y. Ohnuma, K. Orikawa and J. Itoh, "A single-phase current-source PV inverter with power decoupling capability using an active buffer," *IEEE Trans. Ind. Appl.*, vol. 51, no. 1, pp. 531-538, January 2015.

[5] H. Watanabe, K. Kusaka, K. Furukawa, K. Orikawa and J. Itoh, "DC to single-phase AC voltage source inverter with power decoupling circuit based on flying capacitor topology for PV system," in *Proc. 31st Annu. IEEE Appl. Power Electron. Conf. Expo. (APEC)*, March 2016, pp. 1336-1343.

[6] G. Zhu, S. Tan, Y. Chen and C. K. Tse, "Mitigation of low-frequency current ripple in fuel-cell inverter systems through waveform control," *IEEE Trans. Power Electron.*, vol. 28, no. 2, pp. 779-792, February 2013.

[7] W. Yao, X. Wang, P. C. Loh, X. Zhang and F. Blaabjerg, "Improved Power Decoupling Scheme for a Single-Phase Grid-Connected Differential Inverter With Realistic Mismatch in Storage Capacitances," *IEEE Trans. on Power Electron.*, vol. 32, no. 1, pp. 186-199, January 2017.

[8] H. Zhang, X. Li, B. Ge and R. S. Balog, "Capacitance, dc Voltage Utilizaton, and Current Stress: Comparison of Double-Line Frequency Ripple Power Decoupling for Single-Phase Systems," *IEEE Ind. Electron. Magazine*, vol. 11, no. 3, pp. 37-49, September 2017.

The invention claimed is:

1. A single-phase voltage source inverter comprising:
a first stage adapted to be connected to a DC source, wherein the DC source provides an input DC current and a second stage adapted to be connected to an AC load, whereby the AC load includes a second-order ripple power as produced by an AC voltage and an AC current,
the first stage comprising a bridge leg comprising first and second current-bidirectional decoupling switches, the bridge leg connected through an inductor connected between the decoupling switches to a small film decoupling capacitor, where the decoupling capacitor is in series with the DC source when the inverter is connected to the DC source, whereby current can flow into and out of the decoupling capacitor bi-directionally,
the second stage comprising a bi-directional inverter comprising first, second, third and fourth switches,
a first controller for modulating the first stage to provide power decoupling functionality comprising diverting the second-order ripple power into the small film decoupling capacitor, whereby the second-order ripple is removed from the input DC current,
and a second controller for modulating the second stage.

2. The single-phase voltage source inverter of claim 1, wherein the first and second decoupling switches are the only decoupling switches in the bridge leg.

3. The single-phase voltage source inverter of claim 1, wherein the bi-directional inverter is an H-bridge.

4. The single-phase voltage source inverter of claim 1, wherein the first controller uses pulse width modulation and the second controller uses sinusoidal pulse width modulation.

5. The single-phase voltage source inverter of claim 1, wherein the first controller uses sinusoidal pulse width modulation and the second controller uses pulse energy modulation.

6. The single-phase voltage source inverter of claim 1, wherein the AC load is an AC grid.

7. The single-phase voltage source inverter of claim 1, wherein the small film capacitor has a capacitance measured in micro Farads.

8. The single-phase voltage source inverter of claim 1, wherein the small film capacitor has a capacitance of 160 micro Farads.

9. The single-phase voltage source inverter of claim 1, wherein modulating the first stage to provide power decoupling functionality in the first stage further comprises:
controlling voltage across the decoupling capacitor as a DC-biased sine wave, adding a DC component of the voltage across the decoupling capacitor with input DC voltage from the DC source thereby providing voltage-boosting functionality, and
cancelling out the second-order ripple power using an AC component of the voltage across the decoupling capacitor.

* * * * *